US006922262B2

(12) United States Patent
Takano et al.

(10) Patent No.: US 6,922,262 B2
(45) Date of Patent: Jul. 26, 2005

(54) IMAGE PROCESSING APPARATUS

(75) Inventors: Gaku Takano, Yokohama (JP);
Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 885 days.

(21) Appl. No.: 09/921,697

(22) Filed: Aug. 6, 2001

(65) Prior Publication Data

US 2003/0025954 A1 Feb. 6, 2003

(51) Int. Cl.$^7$ .......................... G06K 15/00; H04N 1/40
(52) U.S. Cl. ..................... 358/3.2; 358/471; 358/465
(58) Field of Search .......................... 358/3.07, 530, 358/536, 405, 471, 535, 3.3, 3.08, 3.2

(56) References Cited

U.S. PATENT DOCUMENTS

| | | | | |
|---|---|---|---|---|
| 4,977,464 | A | 12/1990 | Ikuta | 358/448 |
| 5,708,514 | A | 1/1998 | Higuchi et al. | 358/458 |
| 6,069,636 | A | 5/2000 | Sayuda et al. | 345/433 |
| 6,377,361 | B1 | 4/2002 | Sakaue et al. | 358/1.9 |
| 2002/0073373 | A1 * | 6/2002 | Nakao et al. | 714/738 |
| 2002/0108079 | A1 * | 8/2002 | Takahashi | 714/738 |
| 2003/0025954 | A1 * | 2/2003 | Takano et al. | 358/536 |

FOREIGN PATENT DOCUMENTS

| | | |
|---|---|---|
| JP | 2-136255 | 5/1990 |
| JP | 9-172537 | 6/1997 |

OTHER PUBLICATIONS

U.S. Appl. No. 09/228,956, filed Jan. 12, 1999, Sakaue.

* cited by examiner

*Primary Examiner*—Jerome Grant, II
(74) *Attorney, Agent, or Firm*—Foley & Lardner LLP

(57) ABSTRACT

There is disclosed an image processing apparatus in which a pattern table stores a plurality of screen patterns which include a predetermined number of pattern data and have different data patterns. An in-pattern position calculator generates an in-pattern position signal indicating a position of an input image signal in the screen pattern from main and sub scanning synchronizing signals. A pattern selecting signal combining section generates a pattern selecting signal for selecting a specified pattern in the pattern table from the input image signal, combines the pattern selecting signal and the in-pattern position signal supplied from the in-pattern position calculator, and supplies an address in the pattern table. A controller reads pattern data corresponding to the address in the pattern table from the pattern table and supplies image data.

25 Claims, 11 Drawing Sheets

| Pattern corresponding to Pin=10 (hexadecimal) | Pattern corresponding to Pin=20 (hexadecimal) | Pattern corresponding to Pin=40 (hexadecimal) |
|---|---|---|
| FIG. 5A | FIG. 5B | FIG. 5C |

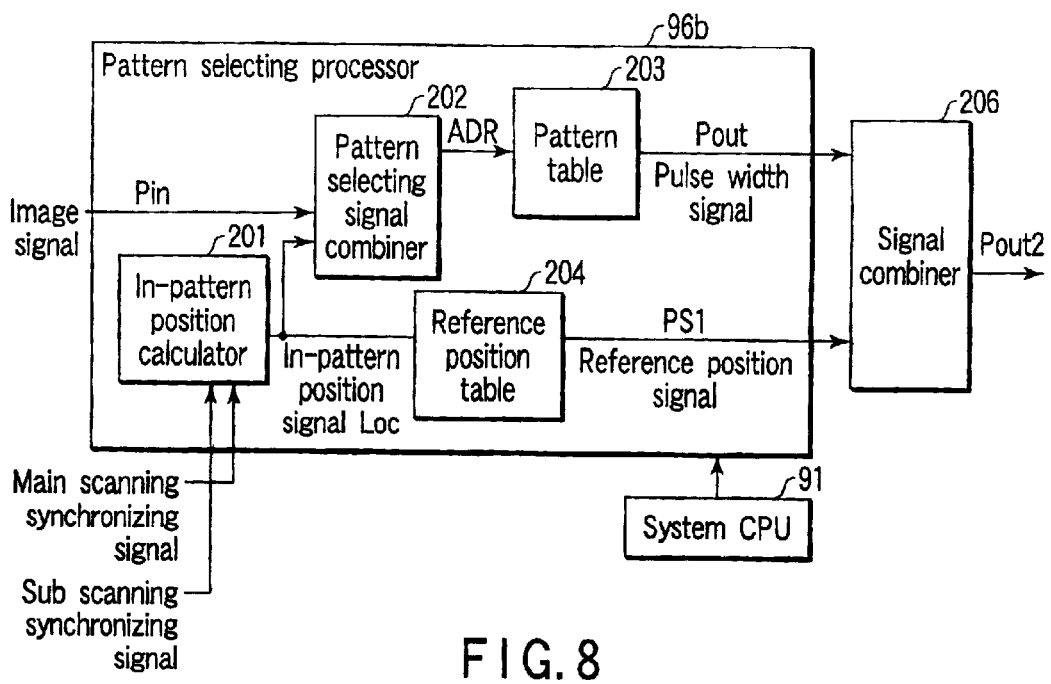
FIG. 8
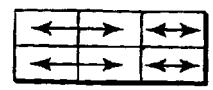
03 : Right
02 : Left
00 : Center
FIG. 9A
FIG. 9B
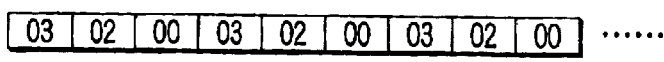
FIG. 9C
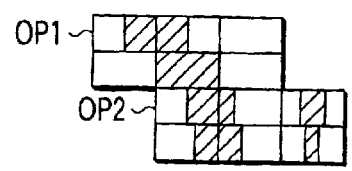
FIG. 9D
FIG. 9E

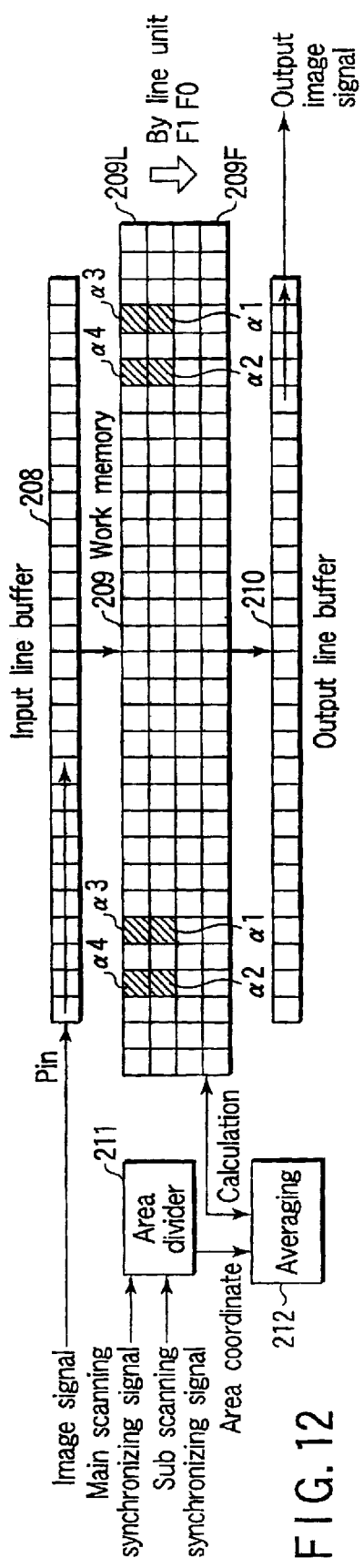
F I G. 12
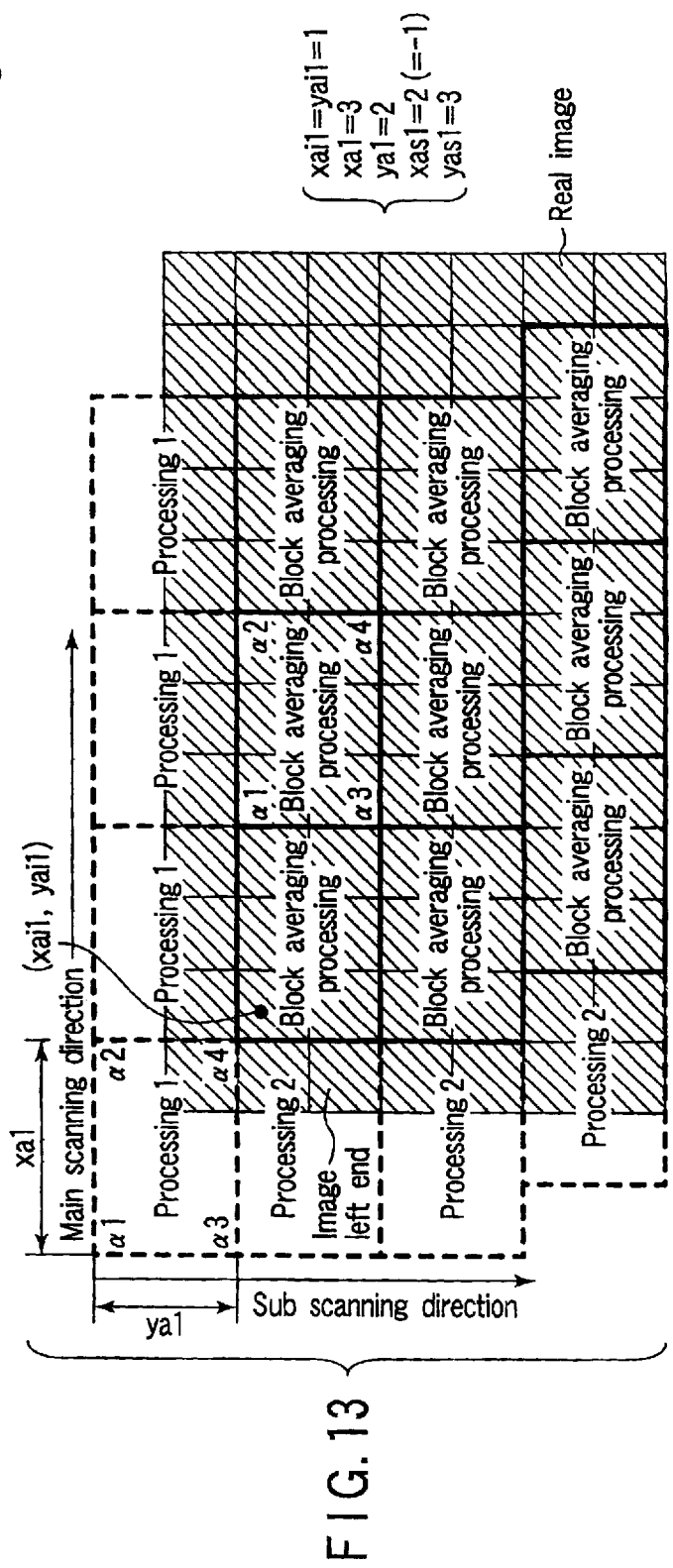
F I G. 13

Constitution example of block averaging processing parameter

| Symbol | Bit number | Range, code, and the like | Meaning of signal |
|---|---|---|---|
| xai1 | 3 | [0-5], additionally 0≦xai1<xa1 | Main scanning coordinate of processing start of averaging block |
| yai1 | 2 | [0-2], additionally 0≦yai1<ya1 | Sub scanning coordinate of processing start of averaging block |
| xa1 | 3 | [1-6] | Size (main scanning) of averaging block |
| ya1 | 2 | [1-3] | Size (sub scanning) of averaging block |
| xas1 | 3 | [0-5], additionally 0≦xas1<xa1 | Skew of averaging block |
| yas1 | 3 | [1-4] | Skew of averaging block |

F I G. 14

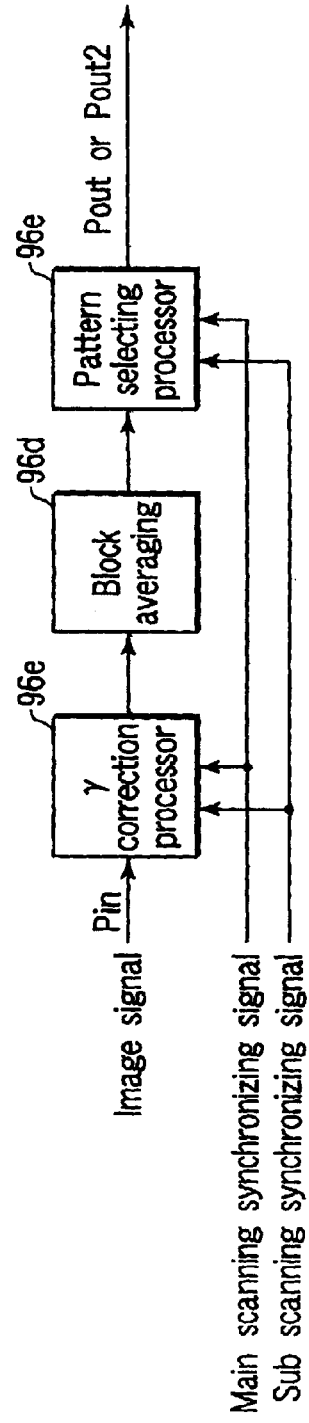

F I G. 15

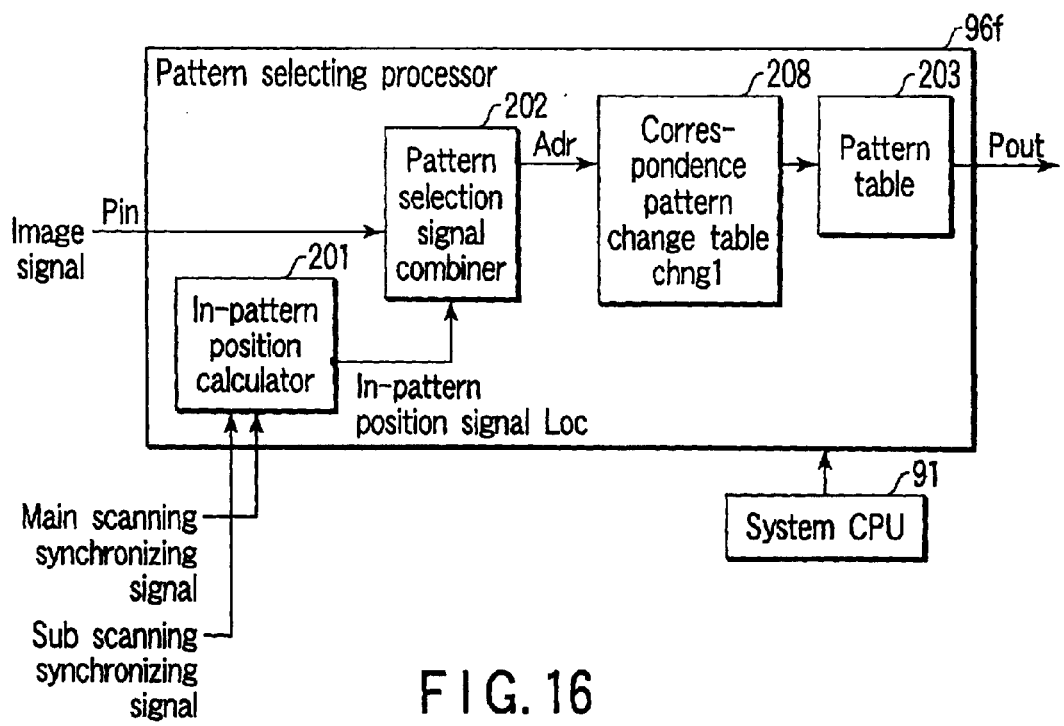
F I G. 16
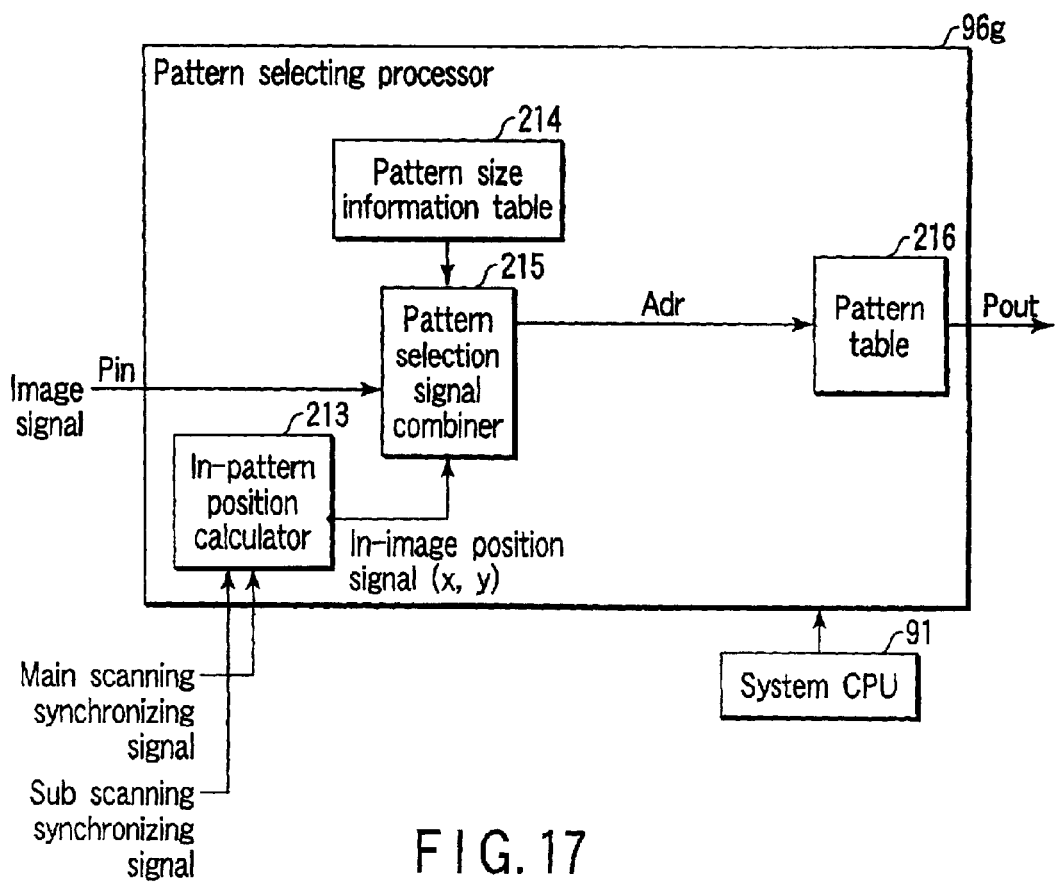
F I G. 17

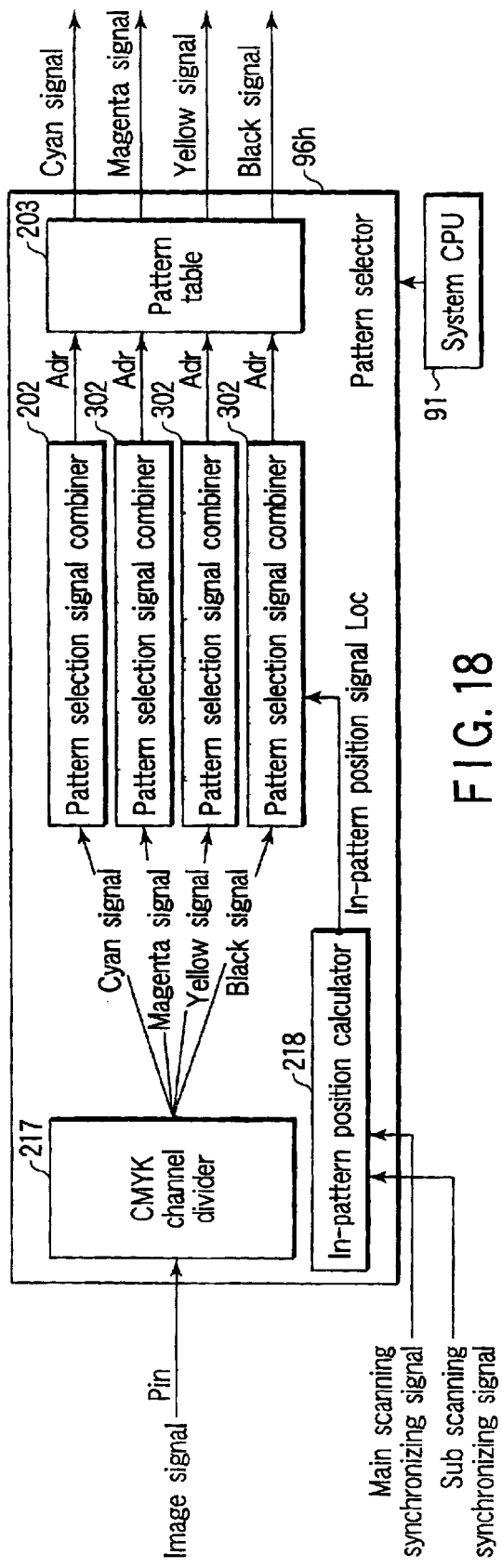
F I G. 18
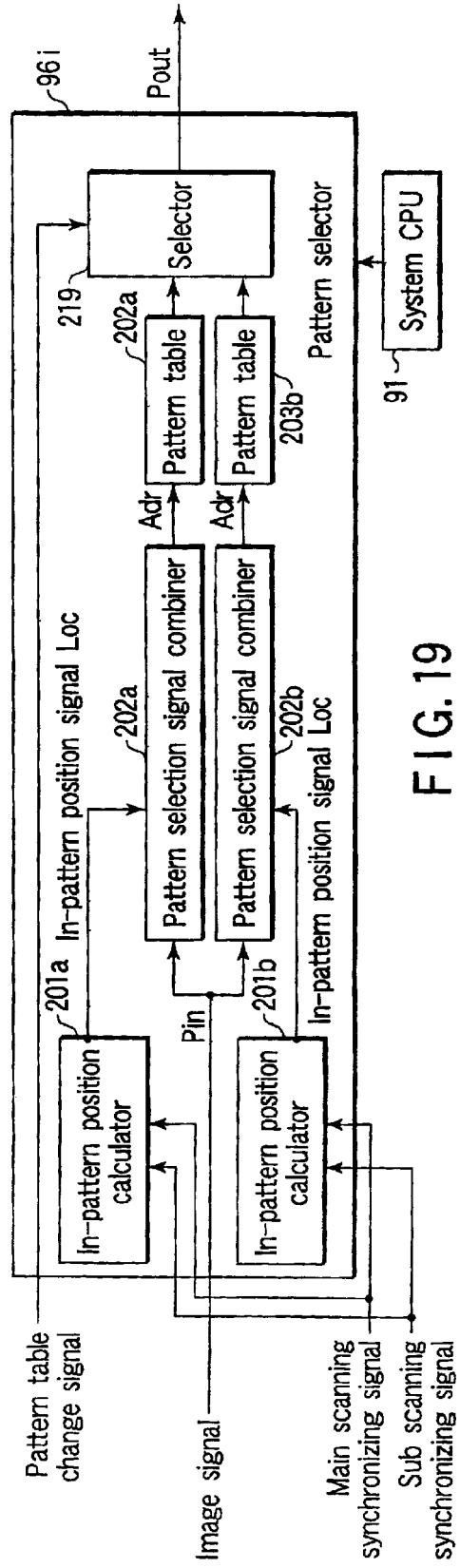
F I G. 19

IMAGE PROCESSING APPARATUS

BACKGROUND OF THE INVENTION

The present invention relates to a half tone processing for use in image forming apparatuses such as a digital copying apparatus, particularly to an image processing apparatus for reproducing a half tone image by a screen processing.

An object of a screen processing is consider properties of recording apparatuses arranged in subsequent stages, modulate an input image signal to a mesh-dot image or multi-line form, and reproduce a half tone image. In the mesh-dot image form, a plurality of outputted dots form one mass, and the masses are regularly arranged like meshes of a net in the image.

In the screen processing of a multi-line system, a width of an output pixel is changed in accordance with a value of the input image signal and half tone is represented. There has heretofore been a technique of comparing a triangular wave or another reference signal outputted from an analog circuit with the input image signal and forming a multi-line screen. That is, a comparator compares a monotonously increasing or decreasing triangular wave with an image signal obtained by D/A conversion of input image data in a period of one or several pixels. For example, when an amplitude of the triangular wave is larger than that of the image signal, "H" is outputted (i.e., laser is turned ON), and the image is formed in the pixel. A period of the triangular wave is the same as that of the image signal. When the monotonously increasing triangular wave is used, the image is formed, for example, on a right side in the pixel. When the monotonously decreasing triangular wave is used, the image is formed, for example, on a left side in the pixel.

A type of an outputted image pattern is limited in the aforementioned conventional screen processing. That is, since a constitution is fixed, various screen patterns cannot be handled.

SUMMARY OF THE INVENTION

An object of the present invention is to realize various screen processings such as a multi-line with a simple system constitution.

In order to achieve the above object, according to one aspect of the present invention, there is provided an image processing apparatus comprising: a pattern table which stores a plurality of screen patterns including a predetermined number of pattern data and having different data patterns; an in-pattern position calculator which generates an in-pattern position signal indicating a position of an input image signal in the screen pattern from a main scanning synchronizing signal and a sub scanning synchronizing signal; a pattern selecting signal combining section which generates a pattern selecting signal which selects a specified pattern in the pattern table from the input image signal, combines the pattern selecting signal with the in-pattern position signal supplied from the in-pattern position calculator, and supplies an address in the pattern table; and a pattern table reading section which reads pattern data corresponding to the address in the pattern table from the pattern table and supplying image data.

Various screen processings such as a mesh-dot image and a multi-line are easily realized by rewriting data in the pattern table. In this manner, different from a method of using a systematic dither processing to form a screen, in the present invention there is not a comparator which compares the input image signal with the pattern data.

The pattern table has an index for associating the inputted image signal with the screen pattern data, and an association between the image signal and the screen pattern data is changed by rewriting the index in the pattern table.

According to another aspect of the present invention, there is provided an image processing apparatus comprising: a pattern table which stores a plurality of screen patterns including a predetermined number of pattern data and having different data patterns; an in-pattern position calculator which generates an in-pattern position signal indicating a position of an input image signal in the screen pattern from a main scanning synchronizing signal and a sub scanning synchronizing signal; a pattern selecting signal combining section which generates a pattern selecting signal for selecting a specified pattern in the pattern table from the input image signal, and calculates an address in the pattern table and data for interpolation for use in an interpolation processing from the pattern selecting signal and the in-pattern position signal supplied from the in-pattern position calculator; an interpolation original data reading section which reads two consecutive pattern data in an address space of the pattern table as interpolation original data from the pattern table based on the address in the pattern table calculated by the pattern selecting signal combining section; and an interpolation processor which uses the data for interpolation calculated by the pattern selecting signal combining section, subjects the two interpolation original data read by the interpolation original data reading section to the interpolation processing, and supplies a result of the interpolation processing as image data.

An enormous storage capacity is necessary for storing screen pattern information in accordance with all signal levels of the input image signal. However, in the present invention, only the screen pattern information corresponding to a specified signal in a signal range is stored as described above, and interpolated and used as the occasion demands. Therefore, the storage capacity for use can remarkably be reduced.

Moreover, in a recording apparatus for using a pulse width signal and pulse position signal to record the image, the screen pattern information regarding the pulse width signal and pulse position signal is separated, and a plurality of screen pattern information regarding a certain pulse position signal are set to be the same in accordance with the image signal level. Therefore, the storage capacity for use can be reduced.

Furthermore, a block averaging processor which divides the input image into small blocks, and averaging the image data in each block is disposed in a previous stage of the aforementioned screen processing. Therefore, a more possibly generated by periodic property of the input image signal can be removed.

Additionally, when the reading address of the screen pattern table is changed for each signal channel (cyan, magenta, yellow, black, and the like), different screens can be formed with one pattern table (for one channel).

BRIEF DESCRIPTION OF THE DRAWINGS

FIGS. 5A to 5C show pattern data examples of the 4×4 screen pattern.

FIG. 8 shows a constitution of the pattern selecting processor according to a second embodiment of the present invention.

FIGS. 9A to 9E are explanatory views of a reference position.

FIG. 12 shows a schematic constitution of a block averaging section of FIG. 11.

FIG. 13 is an explanatory view of a block averaging processing.

FIG. 14 shows a constitution example of a block averaging processing parameter.

FIG. 15 is a block diagram showing a constitution of the image processor according to a fifth embodiment of the present invention.

FIG. 16 shows a constitution of the pattern selecting processor according to a sixth embodiment of the present invention.

FIG. 17 shows a constitution of the pattern selecting processor according to a seventh embodiment of the present invention.

FIG. 18 shows a constitution of the pattern selecting processor according to an eighth embodiment of the present invention.

FIG. 19 shows a constitution of the pattern selecting processor according to a ninth embodiment of the present invention.

DETAILED DESCRIPTION OF THE PREFERRED EMBODIMENTS

Preferred embodiments of the present invention will be described hereinafter with reference to the drawings.

Figure 1:
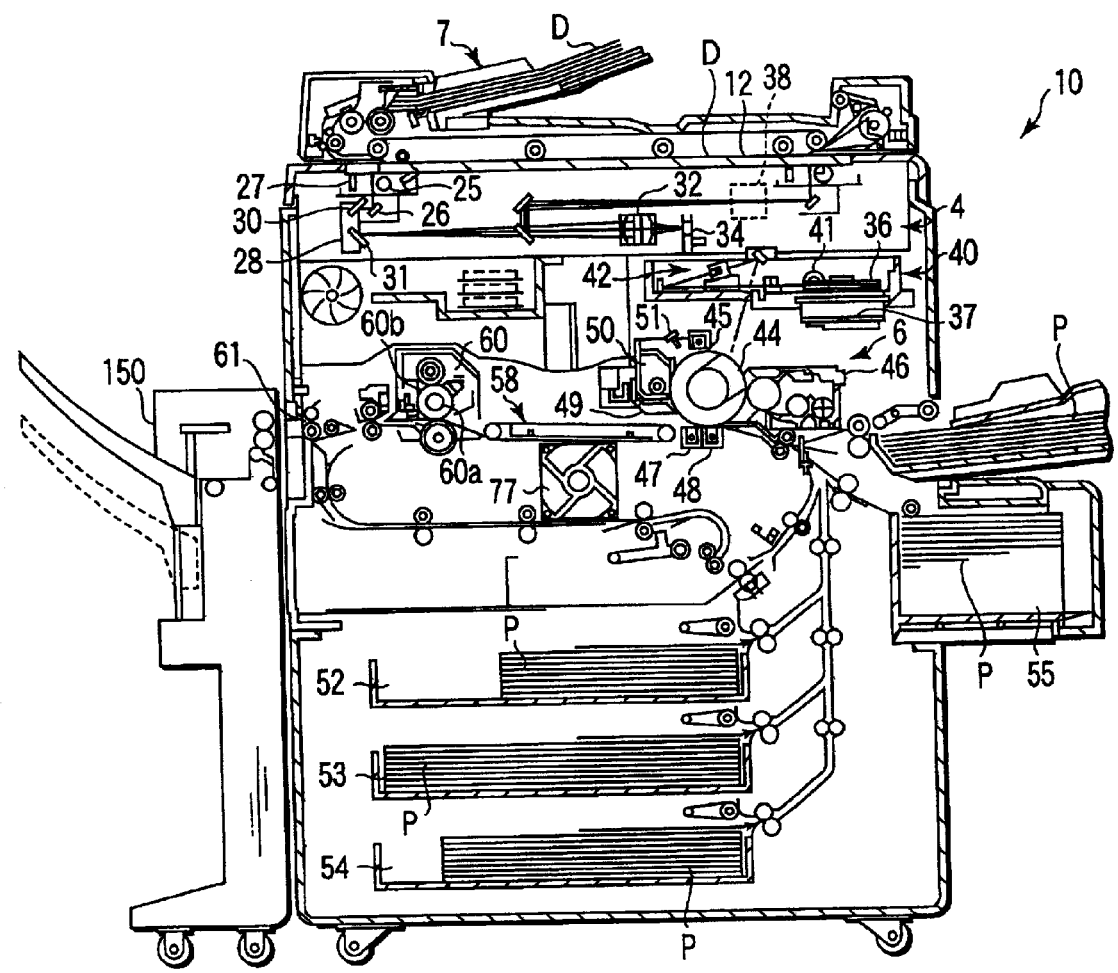
FIG. 1 is a sectional view showing an internal structure of a digital copying apparatus 10 to which the present invention is applied.

FIG. 1 is a sectional view showing an internal structure of a digital copying apparatus 10 to which the present invention is applied. The digital copying apparatus 10 includes a scanner 4 which functions as reading means, and a printer 6 which functions as image forming means as described later.

An original base 12 formed of transparent glass on which a reading object, that is, a draft D is laid is disposed on an upper surface of the digital copying apparatus 10. Moreover, an automatic draft feeder 7 (hereinafter referred to as ADF) for automatically feeding the draft D onto the draft base 12 is disposed on the upper surface of the digital copying apparatus 10. The ADF 7 is disposed to be openable/closable with respect to the draft base 12, and also functions as a draft press for attaching the draft D laid on the draft base 12 to the draft base 12.

The scanner 4 disposed in the digital copying apparatus 10 has an exposure lamp 25 as a light source for irradiating the draft D laid on the draft base 12, and a first mirror 26 for deflecting a reflected light from the draft D in a predetermined direction. These exposure lamp 25 and first mirror 26 are attached to a first carriage 27 disposed under the draft base 12.

The first carriage 27 is disposed to be movable in parallel to the draft base 12, and is reciprocated/moved under the draft base 12 by a driving motor 38 via a toothed belt (not shown).

Moreover, a second carriage 28 movable in parallel to the draft base 12 is disposed under the draft base 12. Second and third mirrors 30, 31 for successively deflecting the reflected light deflected from the draft D by the first mirror 26 are attached to the second carriage 28 and disposed at right angles to each other. The second carriage 28 is driven with respect to the first carriage 27 via the toothed belt, and the like for driving the first carriage 27, and moved along the draft base 12 and in parallel to the first carriage 27 at a ½ speed.

Furthermore, an image forming lens 32 for focusing the reflected light from the third mirror 31 on the second carriage 28, and a CCD sensor 34 for receiving and photoelectrically converting the reflected light focused by the image forming lens 32 are disposed under the draft base 12.

On the other hand, the printer 6 includes a laser exposure device 40 which functions as an exposure scanning device. The laser exposure device 40 includes a semiconductor laser 41 as a light source, a polygon mirror 36 as a scanning member for continuously deflecting a laser light emitted from the semiconductor laser 41, a polygon motor 37 as a scanning motor for rotating/driving the polygon mirror 36 at a predetermined number of rotations, and a laser optical system 42 for deflecting the laser light from the polygon mirror 36 and guiding the laser light to a photosensitive drum 44 as described later.

The semiconductor laser 41 is controlled to turn on/off in accordance with image information, and the like of the draft D read by the scanner 4. In the laser exposure device 40, the laser light is directed to the photosensitive drum 44 via the polygon mirror 36 and laser optical system 42, and scanned on a peripheral surface of the photosensitive drum 44 to form an electrostatic latent image on the peripheral surface of the photosensitive drum 44. Disposed in a periphery of the photosensitive drum 44 are: an electric charger 45 for charging the peripheral surface of the photosensitive drum 44 at a predetermined potential before the image is formed on the peripheral surface; a developing unit 46 as developing means for supplying toner as a developer to the electrostatic latent image formed on the peripheral surface of the photosensitive drum 44 and developing the image at a desired image density; a stripping charger 47 for separating an image forming material supplied from a paper cassette described later, that is, a copy paper P from the photosensitive drum 44; a transfer charger 48 for transferring a toner image formed on the photosensitive drum 44 to the paper P; a stripping pawl 49 for stripping the copy paper P from the peripheral surface of the photosensitive drum 44; a cleaner 50 for cleaning toner remaining on the peripheral surface of the photosensitive drum 44; and a static eliminator 51 for eliminating electricity of the peripheral surface of the photosensitive drum 44 in order. The photosensitive drum 44, a developing roller (not shown) in the developing unit 46, and the like are rotated/driven by a main motor 77.

An upper cassette 52, middle cassette 53, and lower cassette 54 which can be drawn from an apparatus main body, respectively, are stacked and disposed in a lower part of the digital copying apparatus 10, and a large-capacity feeder 55 is disposed on the side of the apparatus. The copy paper P having different sizes or directions is loaded in the respective cassettes.

In the digital copying apparatus 10, a conveying path 58 is extended through a transfer section positioned between the photosensitive drum 44 and the transfer charger 48 from the respective cassettes and large-capacity feeder 55. A fixing device 60 having a fixing lamp 60a and a heat roller 60b to which heat is given by the fixing lamp 60 is disposed in a terminal end of the conveying path 58. A discharge port 61 is formed in a side wall of the digital copying apparatus 10 and disposed opposite to the fixing device 60, and a finisher 150 including a single tray is attached to the discharge port 61.

Figure 2:
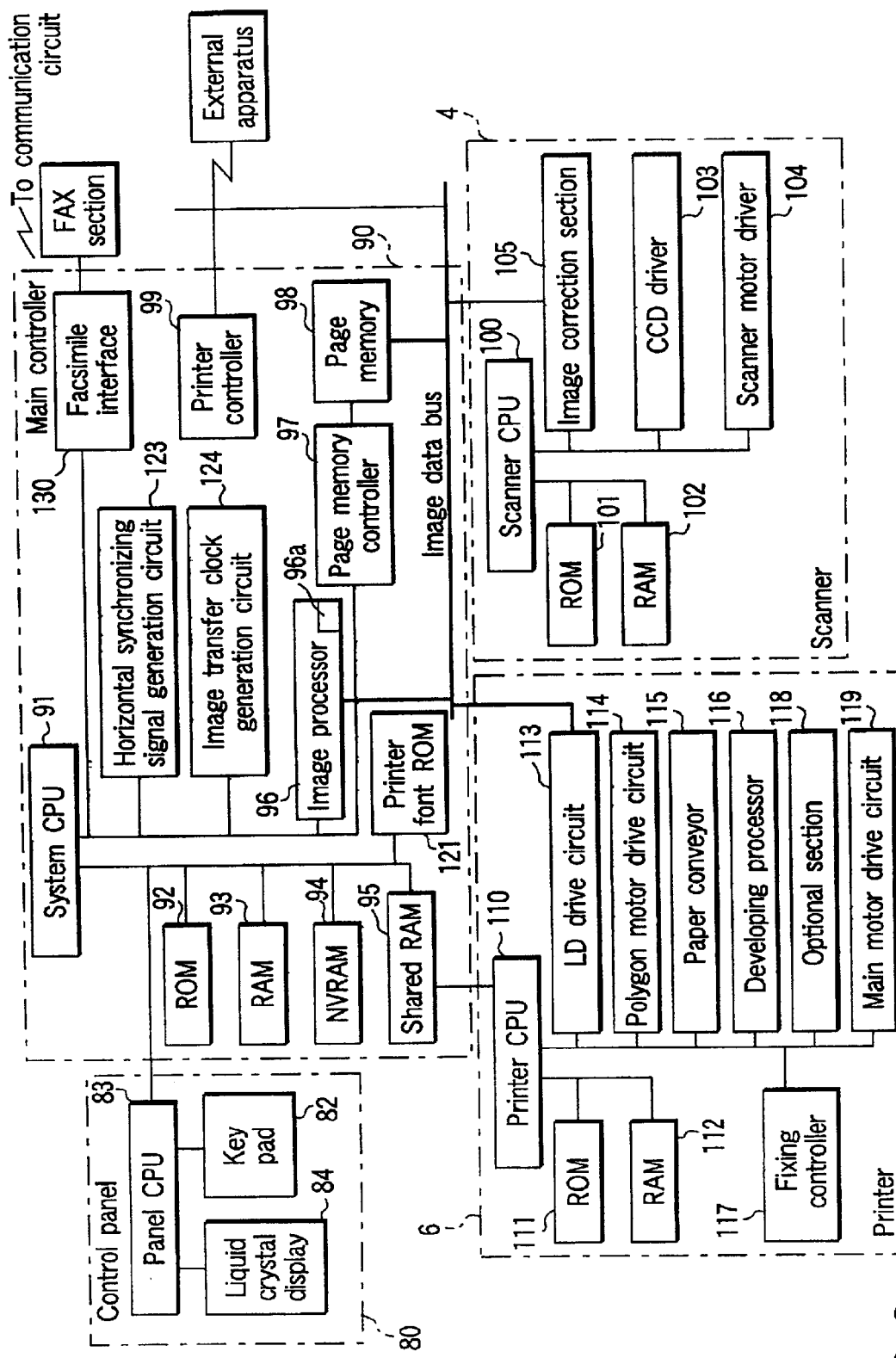
FIG. 2 is a block diagram schematically showing a constitution of a control system of the digital copying apparatus to which the present invention is applied.

FIG. 2 is a block diagram schematically showing a constitution of a control system of the digital copying apparatus to which the present invention is applied.

The digital copying apparatus is constituted of a main controller 90 controlled by a system CPU 91, the scanner 4 controlled by a scanner CPU 100, the printer 6 controlled by a printer CPU 110, and a control panel 80 controlled by a panel CPU 83.

The main controller 90 is constituted of the system CPU 91, a ROM 92, a RAM 93, a NVRAM 94, a shared RAM 95, an image processor 96, a page memory controller 97, a page memory 98, a printer font ROM 121, a horizontal synchronizing signal generation circuit 123, an image transfer clock generation circuit 124, and a facsimile interface 130.

The ROM 92 stores various control programs including the present invention. The system CPU 91 uses the RAM 93 as a work area, and controls the whole main controller 90 in accordance with the control program stored in the ROM 92. The system CPU 91 transmits an operation instruction to the printer 6 (printer CPU 110) and scanner 4 (scanner CPU 100), and the printer 2 and scanner 4 return a status to the system CPU 91.

The nonvolatile RAM (NVRAM) 94 is a nonvolatile memory backed up by a battery (not shown). When power is turned off, data on the NVRAM 94 is held. Moreover, the NVRAM 94 stores a default value (initial set value) for hardware elements constituting a photographic copying (PPC) function, FAX function, and the like. The shared RAM 95 is used to perform bi-directional communication between the system CPU 91 and the printer CPU 110.

The image processor 96 performs an image processing of the present invention, such as a screen processing, trimming, and masking with respect to the image data inputted from the scanner 4, and the like. The printer font ROM 121 stores font data corresponding to code data of a character or another code.

A printer controller 99 receives the code data of the character or another code from external apparatuses such as a personal computer via LAN. The printer controller 99 uses font data stored in the printer font ROM 121 to develop the code data into image data and store the image data in the page memory 98 with a character size attached to the code data, and a size and resolution corresponding to the data indicating the resolution.

The horizontal synchronizing signal generation circuit 123 generates a horizontal synchronizing signal in synchronization with rotation of the polygon mirror 36. The image transfer clock generation circuit 124 generates an image transfer clock to control a timing for transferring the image data.

The page memory controller 97 stores or read the image data with respect to the page memory 98. The page memory 98 has an area in which the image data, for example, for two pages can be stored, and has a constitution in which data obtained by compressing the image data from the scanner 4 or the printer controller 99 can be stored by a unit of one page.

The printer 6 is constituted of: the printer CPU 110 for controlling the whole printer 6; a ROM 111 in which control program, and the like are stored; a RAM 112 for storing data; an LD drive circuit 113 for controlling light emission by the semiconductor laser 41 to turn on/off; a polygon motor drive circuit 114 for controlling the polygon motor 37 of the laser unit 40; a paper conveyor 115; a developing processor 116; a fixing controller 117; an optional section 118, and a main motor drive circuit 119.

The scanner 4 includes the scanner CPU 100, a ROM 101, a RAM 102, a CCD driver 103, a scanner motor driver 104, and an image corrector 105. The scanner CPU 100 controls the whole scanner 4, the ROM 101 stores the control program, and the like, and the RAM 102 is used for temporarily storing the data. The CCD driver 103 drives the CCD sensor 34, and the scanner motor driver 104 controls rotation of the driving motor 38 for moving the first and second carriages 27, 28 of the exposure lamp 25 and mirrors 26, 30, 31. The image corrector 105 includes: an A/D conversion circuit for converting an analog signal from the CCD sensor 34 to a digital signal; and a shading correction circuit for correcting a fluctuation of a threshold level with respect to an output signal from the CCD sensor 34, which is caused by a dispersion of the CCD sensor 34, an ambient temperature change, and the like.

Figure 3:
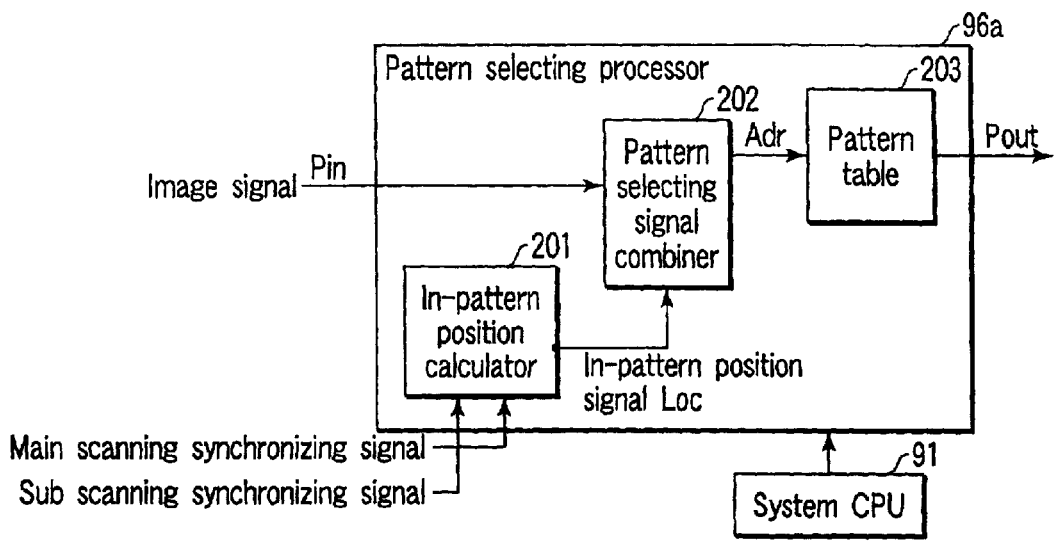
FIG. 3 is a block diagram showing a schematic constitution of a pattern selecting processor for performing a direct pattern selecting method.

A first embodiment of the screen processing according to the present invention now will be described. The embodiment is called a direct pattern selecting method. FIG. 3 is a block diagram showing a schematic constitution of a pattern selecting processor 96a for performing the direct pattern selecting method. This pattern selecting processor 96a is a processor included in the image processor 96, constituted of an in-pattern position calculator 201, pattern selecting signal combiner 202, and a pattern table 203, and generally controlled by the system CPU 91.

The pattern selecting method is a screen processing method comprising: reading data corresponding to a position in the pattern of the image signal from a screen pattern corresponding to a value of an inputted image signal Pin; and outputting the data. The image signal Pin is, for example, eight-bit data, and a plurality of screen patterns are stored in the pattern table 203.

Figure 4:
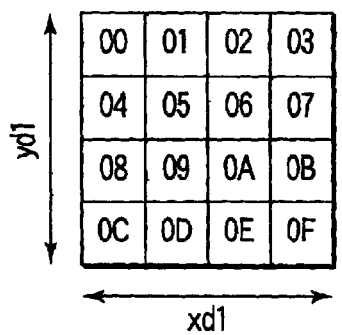
FIG. 4 shows an in-pattern position Loc in a screen pattern having a size of 4×4.

First, calculation of an in-pattern position will be described hereinafter. An in-pattern position Loc represents an internal coordinate of two-dimensional screen pattern in one dimension. FIG. 4 shows an example of the in-pattern position Loc in the screen pattern having a size of 4×4. In FIG. 4, xd1, yd1 denote pattern sizes. As shown in FIG. 4, the in-pattern position Loc is indicated by a left upper value 00H to a right lower value 0FH (H denotes hexadecimal).

Moreover, FIGS. 5A to 5C show examples of the 4×4 screen pattern (pattern data). FIG. 5A shows the pattern selected when the input image signal Pin is of 10H, FIG. 5B shows the pattern selected when the signal is of 20H, and FIG. 5C shows the pattern selected when the signal is of 40H. In this manner, the screen patterns of different data patterns are stored in accordance with a value (density) of the image signal.

Figure 6:
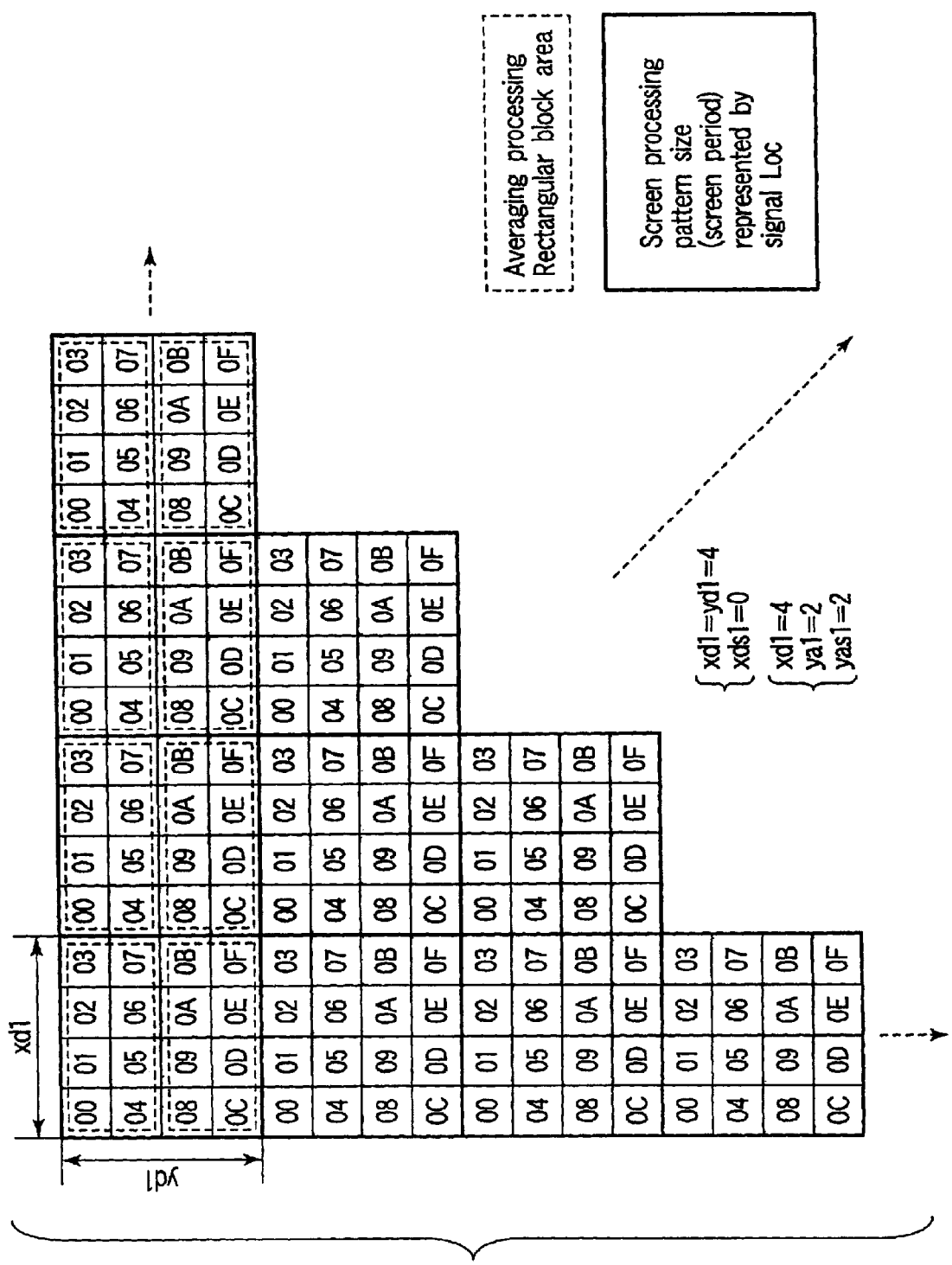
FIG. 6 shows a change of the in-pattern position Loc in a pattern image.

FIG. 6 shows a change of the signal Loc in a real image or a processing object image (a content of an averaging processing described later is also shown). This shows a pattern image with xd1=yd1=4, xds1=0. Here, xds1 is an offset amount by which the pattern is shifted in a main scanning direction for each sub scanning period of the pattern (this can make an angle in arrangement of the patterns).

The in-pattern position Loc (eight or more bits) is calculated from an X coordinate value x (main scanning direction) and Y coordinate value y (sub main scanning direction) of a noted image, which are obtained by counting main and sub scanning synchronizing signals as follows.

yy=y%yd1 yya=(y/yd1)%xd1 xx=(x+yya*xds1)%xd1

Loc=yy*xd1+xx

* a/b denotes an integer portion of a quotient of a time at which a is divided by b.

* a%b denotes a surplus of the time at which a is divided by b.

The pattern selecting signal combiner 202 now will be described. The pattern selecting signal combiner 202 combines lower eight bits of the in-pattern position Loc with eight bits of the input image signal Pin (all bits of both in the present embodiment) as follows. The eight bits of the input image signal Pin constitute a pattern selecting signal. The pattern selecting signal combiner 202 outputs a combined result as an address signal Adr.

Adr=Combination of lower 8 bits of Loc and upper 8 bits of Pin.

*Combine the bits so that Loc indicates the upper bits and Pin indicates the lower bits.

Figure 7:
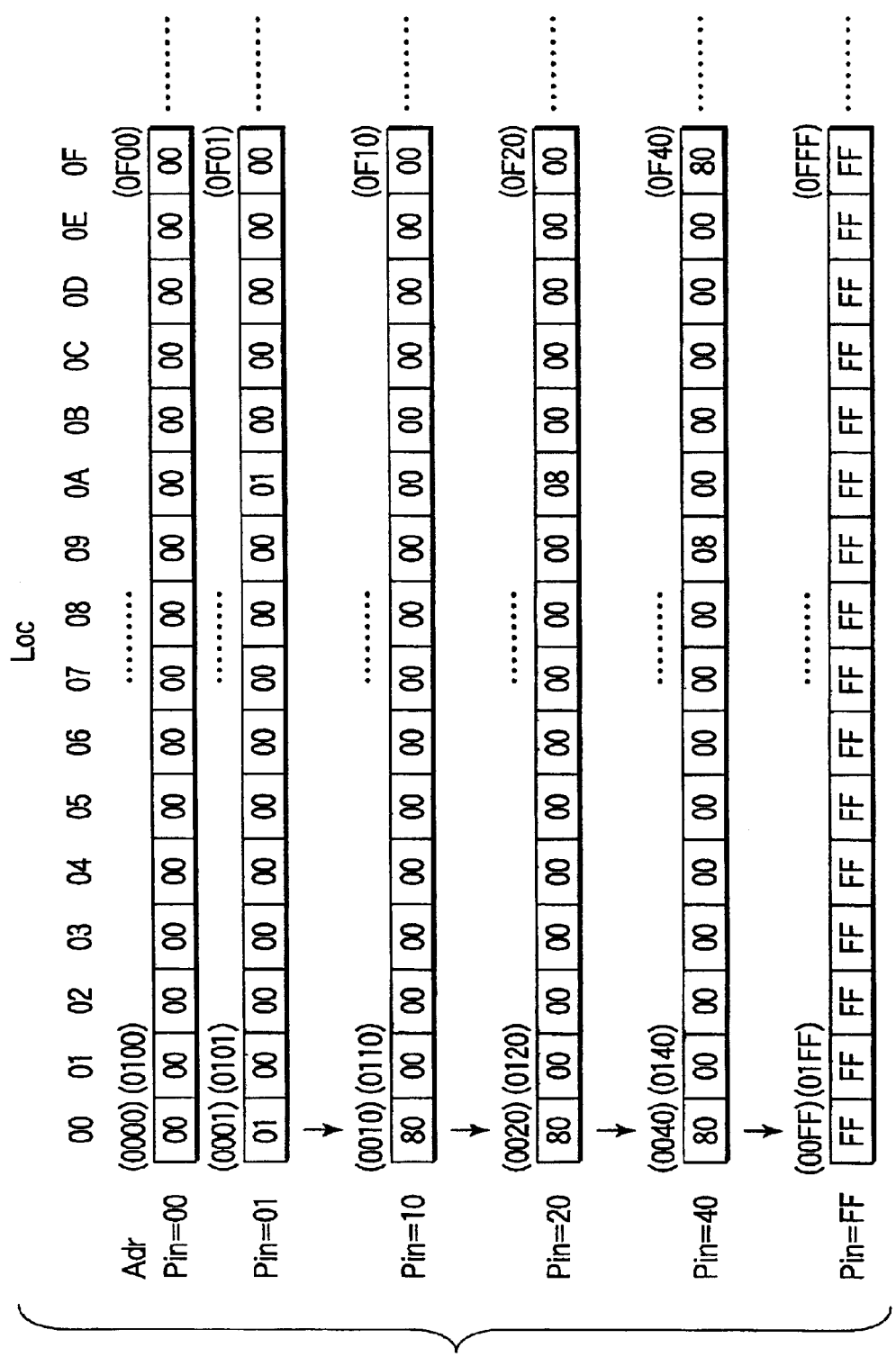
FIG. 7 shows a relation of an address Adr of a pattern table with the pattern data.

The pattern table 203 and table reference output Pout now will be described. As shown in FIG. 7, a plurality of pattern data are stored in accordance with Adr in the pattern table 203. A numeric value in parentheses is an address Adr. As shown in FIG. 7, for the address Adr, 0000H to 00FFH are allotted from upper to lower end of a left-end column, 0100H to 01FFH are allotted from the upper to lower end of the next column, and 0F00H to 0FFFH are allotted from the upper to lower end of a right-end column. Each row corresponds to each screen pattern. FIG. 7 is a pattern table with a pattern size of 4×4, and input image signal of eight bits. When the pattern size or the image signal is larger than this value, the pattern table is enlarged rightwards or downward in FIG. 7.

The pattern data corresponding to the address Adr in the pattern table, in which the input image signal Pin and position signal Loc are combined, is read under control of the controller, and supplied as the table reference output Pout (half tone processing output). Here, "ditw1[i]" means an i-th element of the pattern table. That is, Pout is represented as follows.

Pout=ditw1[Adr]

Additionally, for example, a table including 65536 elements is represented by "ditw1 (65536)". The table reference output Pout is supplied as eight-bit data or pulse width signal.

When the in-pattern position Loc is the same, the pattern data stored in the pattern table 203 may be set to monotonously change (increase or decrease) in accordance with a size of the pattern selecting signal (eight bits of the image signal Pin). Alternatively, the data may be set in such a manner that an increase/decrease direction changes in at least one portion. According to the present embodiment, various screen processing such as a mesh-dot image or a multi-line can easily be realized by rewriting the data in the pattern table 203.

FIG. 8 shows a constitution of a pattern selecting processor 96b according to a second embodiment of the present invention. The pattern selecting processor 96b supplies the pulse width signal as the output Pout. Different from the pattern selecting processor 96a of FIG. 3, a reference position table 204 for outputting a pulse position signal, and a signal combiner 206 are added.

A pulse reference position indicates that the image is formed from a left end, from a right end, or in a center portion in a pixel. FIGS. 9A shows a 3×2 reference position table as one example of the reference position table. In the reference position table, "03" indicates that the image is formed from the right end in the pixel, "02" indicates that the image is formed from the left end, and "00" indicates that the image is formed in the center portion. Therefore, in the reference position table of FIG. 9A, as shown by arrows of FIG. 9B, the image is formed in accordance with a pixel value. The reference position table is repeatedly applied, and values of the reference position table are obtained in one scanning line as shown in FIG. 9C.

When the value of the pulse width signal is obtained in the position corresponding to each element of the 3×2 reference position table, for example, as shown in FIG. 9D, an output image OP1 is obtained as shown in FIG. 9E. FIG. 9E shows output images OP1 and OP2, and shows that the reference position table of FIG. 9A is shifted and applied for each sub scanning of the reference position table.

In the present embodiment shown in FIG. 8, similarly as the pattern shown in FIG. 4, the reference position table 204 has a size of 4×4. Therefore, based on the in-pattern position Loc calculated by the in-pattern position calculator 201, the reference position table (dits1) 204 is referred to under the control of the system CPU 91, the reference position data corresponding to Loc is read, and a pulse position signal PS1 is supplied. That is, the pulse position signal PS1 is represented as follows.

PS1=dits1[Loc]

The signal combiner 206 combines a pulse width signal Pout1 supplied from the pattern table 203 and the pulse position signal PS1 supplied from the reference position table 204, and generates an image signal Pout2 having a width corresponding to the pulse width signal Pout1 in the reference position in each output pixel.

Figure 10:
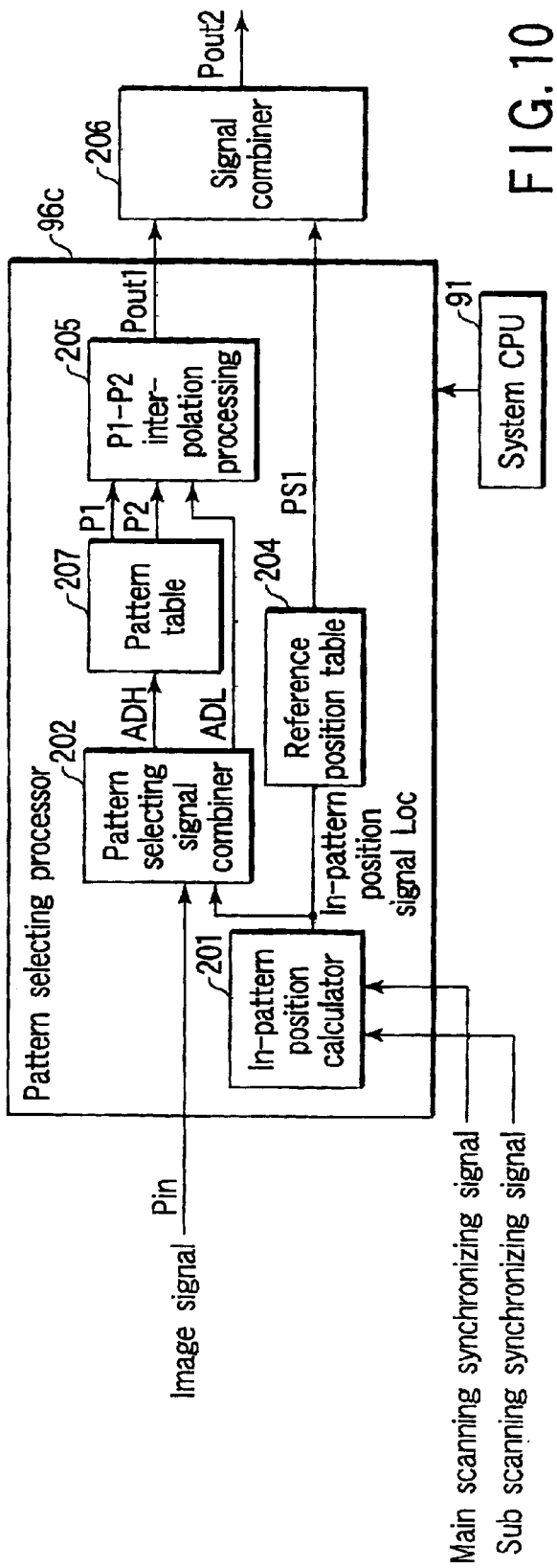
FIG. 10 shows a constitution of the pattern selecting processor according to a third embodiment of the present invention.

FIG. 10 shows a constitution of a pattern selecting processor 96c according to a third embodiment of the present invention. The pattern selecting processor 96c is constituted by adding an interpolation processor 205 to the pattern selecting processor 96b. The interpolation processor 205 performs an interpolation processing based on two pulse width signals P1 and P2 read from a pattern table 207.

The pattern selecting signal combiner 202 combines lower eight bits of the in-pattern position Loc outputted from the in-pattern position calculator 201 and upper eight bits of the input image signal Pin (e.g., ten bits). A combined result is outputted as the address signal Adr (16 bits).

Adr=combination of lower 8 bits of Loc and upper 8 bits of Pin

The pattern selecting signal combiner 202 further separates 16 bits of address signal Adr into upper 13 bits and lower three bits, and outputs ADH, ADL as follows.

ADH=upper 13 bits of Adr

ADL=lower 3 bits of Adr

Under the control of the system CPU 91, the pattern table 207 (ditw1 (8192)) is referred to based on an address upper ADH, and ADH is converted to interpolation original signals P1 and P2 as follows.

P1=ditw1[ADH]
P2=ditw1[ADH+1]

Here, P1 is pattern data stored in address ADH of the pattern table 207, and P2 is pattern data stored in address (ADH+1). That is, the CPU 91 reads two pattern data consecutive in an address space in the pattern table 207.

Additionally, ADH=8191, then ADH+1=8192, and 8192 is out of a range of pattern table ditw1[8192]. This is because the address of the pattern table ditw1[8192] is in a range of 0 to 8191. However, in this case, ditw1[ADH+1], that is, P2 is not referred to in the subsequent stage, and therefore a value of P2 may be indefinite.

The interpolation processor 205 uses the interpolation original signals P1 and P2 to perform the following interpolation processing, and outputs the output value Pout (or Pout 2) as the pulse width signal.

ADW=lower 7 bits of ADH;
if (ADW<127), Pout=(P2*ADL+P1*(8−ADL)/8;
if (ADW=127), Pout=P1.

For example, when ADW is smaller than 127, P1 is 100, P2 is 110, and ADL is 5, Pout is as follows.

$$Pout = (110*5 + 100*(8-5))/8$$
$$= 106.25$$
$$\text{omitting decimals,}$$
$$= 106$$

That is, the interpolation processor 205 subjects the pattern data P1 and P2 to a linear interpolation processing using ADL.

The pattern selecting processor 96b of FIG. 8 directly refers to the pattern table and determines the pulse width signal. However, the pattern selecting processor 96c of the present embodiment decreases the number of screen patterns in order to reduce a storage capacity of the pattern table, and obtains omitted pattern data in the interpolation processing.

Also in the pattern selecting processor 96c, under the control of the system CPU 91, the pulse reference position table (dits1) 204 is referred to based on the in-pattern position Loc, and the pulse position signal PS1 is provided as follows.

PS1=dits1[Loc]

Figure 11:
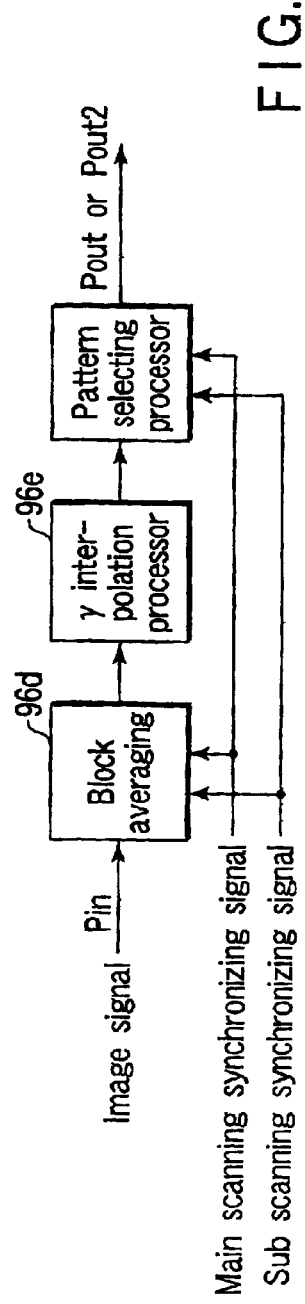
FIG. 11 is a block diagram showing a constitution of an image processor according to a fourth embodiment of the present invention.

FIG. 11 is a block diagram showing a constitution of the image processor according to a fourth embodiment of the present invention. In the fourth embodiment, a block averaging section 96d, and γ correction processor 96e are added in this order to the previous stage of the pattern selecting processor.

In FIG. 11, the block averaging section 96d divides the input image into areas (blocks) based on the main and sub scanning synchronizing signals, and converts the signals in order to average the divided areas.

FIG. 12 shows a schematic constitution of the block averaging section 96d. The block averaging section 96d is constituted of an input line buffer (line memory) 208, a work memory 209 formed of a plurality of line memories, an output line buffer (line memory) 210, an area divider 211, and an averaging unit 212.

The image signal Pin inputted to the input line buffer 208 is shifted in an arrow direction and stored as the image data in the input line buffer 208. The image data for one line stored in the input line buffer 208 is copied to a last line memory 209L of the work memory 209 by a line unit in response to the sub scanning synchronizing signal. In the work memory 209, the image data is copied into the next line memory by the line unit in a fast in fast out (FIFO) form in response to the sub scanning synchronizing signal. The data in a front line memory 209F of the work memories is copied to the output line buffer 210 before a copy operation from the previous line memory. The image data copied into the output line buffer 210 is shifted in the arrow direction in response to the main scanning synchronizing signal, and outputted to the subsequent γ correction processor 96e.

The area divider 211 counts the main and sub scanning synchronizing signals, and outputs an area coordinate of a rectangular block in the work memory 209 to the averaging unit 212 at a time when predetermined area division, for example, rectangular block division is possible. The averaging unit 212 having received the area coordinate performs a processing of averaging the values in the block of the designated area in the work memory 209, and burying the value in the block.

The area division by a periodic rectangular block will be described as an example. The averaging unit 212 averages the input image signals Pin in a predetermined rectangular block, and stores an average value as the image signal of each pixel of the block again in the work memory 209.

FIG. 13 shows a schematic diagram of a block averaging processing. It is assumed that an averaging block is rectangular and has a size of xa1 pixels in a main scanning direction and ya1 pixels in a sub scanning direction ($1 \leq xa1 \leq 6$, $1 \leq ya1 \leq 3$). A start point of the averaging block in the image is (xai1, yai1), and the averaging blocks are shifted by the xas1 pixels in a negative main scanning direction (or xa1−xas1 in a positive direction) for every yas1 blocks in the sub scanning direction. In FIG. 13, xai1=1, yai=1, xa1=3, ya1=2, xas1=2(=−1), yas1=3.

In averaging calculation, a sum of pixel values, in a rectangle is obtained and divided by the number of pixels in the block. For decimals, numbers of one are rounded up and anything under one is rounded down (binary). A block which is bx-th in the main scanning direction, and by-th in the sub scanning direction is B[bx, by]. Then, a pixel range of the block B[bx, by] is a rectangle which has the following four points as four corners.

α1:(xbs, ybs), α2:(xbs+xa1−1, ybs),
α3:(xbs, ybs+ya1−1), α4:(xbs+xa1−1, ybs+ya1−1)

Additionally, xbs, ybs are as follows.

xbs=xai1+xa1·bx−Int(by/yas1)*xas1
ybs=yai1+ya1·by

*Int(by/yas1) is a maximum integer which does not exceed (by/yas1)

The area divider 211 counts the main and sub scanning synchronizing signals. When the pixel corresponding to the α4 appears in the image data in the work memory 209 as shown in FIG. 12, the divider converts the area coordinate indicated by a rectangular block (α1, α2, α3, α4) to the coordinate in the work memory 209, and outputs the coordinate to the averaging unit 212. Additionally, the pixels shown in FIG. 13 are reversed in order both in the main and sub scanning directions in the work memory 209 of FIG. 12.

The averaging unit 212 uses the rectangular block area coordinate in the work memory 209 to calculate the sum of the pixel values in the area, and a value obtained by dividing the sum by the number of pixels in the area is stored in the area of the work memory 209.

Moreover, when the block averaging processing includes the outside of the area (periphery of a real image shown by slashes of FIG. 13), the processing is performed in accordance with states of four points as follows:

if ((α1 is outside the area and α2 is outside the area): or (α3 is outside the area and α4 is outside the area) upper or lower end of the real image){
  /*processing 1: through*/
  the input pixel is outputted as it is;
}else if (α1 is outside the area and α3 is outside the area: the left end of the real image){
  /*processing 2: substituting the pixel value of the left end, and averaging*/
  an arbitrary area pixel P6(i', j)=P6(o, j) is subjected to the averaging processing;
  /*i' denotes a main scanning coordinate of the pixel outside the area, j denotes a sub scanning coordinate of the pixel outside the area*/
}else if (α2 is outside the area and α4 is outside the area: the right end of the real image){
  /*processing 3: substituting the pixel value of the right end, and averaging*/
  an arbitrary area pixel P6(i', j)=P6(width−1, j) is subjected to the averaging processing;
  /*i' denotes the main scanning coordinate of the pixel outside the area, j denotes the sub scanning coordinate of the pixel outside the area*/
  /*width denotes a size of the image data in the main scanning direction*/
}

FIG. 6 is a schematic diagram in which the screen pattern is associated with the rectangular block for the averaging processing, and xd1=4, yd1=4, xa1=4, ya1=2, yas1=2. FIG. 14 shows a constitution example of a block averaging processing parameter.

FIG. 15 is a block diagram showing a constitution of the image processor according to a fifth embodiment of the present invention. The constitution of the image processor is different from that of FIG. 11 in that the γ correction processor 96e and block averaging section 96d are arranged in this order in the previous stage of the pattern selecting processor. The operation of the block averaging section 96d is similar to that of the aforementioned embodiment.

FIG. 16 shows a constitution of a pattern selecting processor 96f according to a sixth embodiment of the present invention. For the pattern selecting processor 96f, a correspondence pattern conversion table chng1 (65536) 208 is disposed between the pattern table 203 and the pattern selecting signal combiner 202 of FIG. 3. The system CPU 91 refers to the pattern table ditw1 (65536) and table chng1 (65536), and outputs the image signal Pout based on the signal Adr constituted by combining the input image signal Pin and position signal Loc as follows.

Pout=ditw1[chng1[Adr]]

This can realize effective use of bit precision of the pattern table for storing the screen pattern which has non-linear half tone property. Concretely, association between the image signal and the pattern table can be changed by changing the content of the correspondence pattern change table 208.

FIG. 17 shows a constitution of a pattern selecting processor 96g according to a seventh embodiment of the present invention. The pattern size fixed in the pattern selecting processor 96a of FIG. 3 is changed for each screen pattern. That is, a pattern table 216 stores the screen pattern which has various sizes. The screen pattern having an appropriate size is selected in accordance with the value of the image signal Pin. For example, when the image signal Pin is small (density is low), a large screen pattern is selected.

A pattern size information table 214 is added to the pattern selecting processor 96g. During calculation of the address (Loc) in the pattern table, a pattern selecting signal combiner 215 reads size information from the pattern size information table 214, the pattern with the appropriate size is selected, and an in-image position signal (x, y) is used to calculate the address Adr of the pattern table 216.

FIG. 18 shows a constitution of a pattern selecting processor 96h according to an eighth embodiment of the present invention. The pattern selecting processor 96h subjects a color image signal Pin to the screen processing. When the image signals of a plurality of channels (color image signals) are processed, a reading position of the pattern table 203 is changed, and output screen pattern therefore differs with color. Thereby, a probability that different-color dots are outputted in the same position can be lowered, and color unevenness of the output image can be suppressed. An in-pattern position calculator 218 changes a method of calculating the in-pattern position for each channel as follows.

The position Loc of a first channel (e.g., cyan) is calculated as follows.
  yy=y%yd1
  yya=(y/yd1)%xd1
  xx=(x+yya*xds1)%xd1
  Loc=yy*xd1+xx The position Loc of a second channel (e.g., magenta) is calculated as follows.
  yy=y%yd1
  yya=(y/yd1)%xd1
  xx=xd1−(x+yya*xds1)%xd1
  Loc=yy*xd1+xx Therefore, in the present embodiment, an effect similar to the effect obtained by changing the pattern for each color is obtained.

FIG. 19 shows a constitution of a pattern selecting processor 96i according to a ninth embodiment of the present invention. The pattern selecting processor 96i performs different screen processings in parallel to one another, and changes the output in response to a pattern table change signal. A character/photograph identification signal serves as the pattern table change signal for the image processing in a character area/photograph area in PPC.

An in-pattern position calculator 201a, pattern selecting signal combiner 202a, and pattern table 203a constitute, for example, a signal processing block for the character area. An in-pattern position calculator 201b, pattern selecting signal combiner 202b, and pattern table 203b constitute, for example, a signal processing block for the photograph area. A size of the pattern table 203a for the character area is smaller than that of the pattern table 203b for the photograph area. A selector 219 selects and outputs a reference output of one of the pattern tables 203a and 203b in response to the pattern table change signal.

What is claimed is:

1. An image processing apparatus comprising:
  a pattern table which stores a plurality of screen patterns which include a predetermined number of pattern data and have different data patterns;
  an in-pattern position calculator which generates an in-pattern position signal indicating a position of an input image signal in said screen pattern from a main scanning synchronizing signal and a sub scanning synchronizing signal;
  a pattern selecting signal combining section which generates a pattern selecting signal for selecting a specified pattern in said pattern table from said input image signal, combines the pattern selecting signal with said in-pattern position signal supplied from said in-pattern position calculator, and supplies an address in the pattern table; and a pattern table reading section which reads pattern data corresponding to the address in said pattern table from said pattern table and supplying image data.

2. The apparatus according to claim 1, wherein said pattern data read from said pattern table by said pattern table reading section is a pulse width signal, said apparatus further comprises:

a reference position table which stores reference position data for defining a position in a pixel in which the image corresponding to the pulse width signal read from said pattern table is to be formed;

a reference position table reading section which reads said reference position data in said reference position table based on said in-pattern position signal supplied from said in-pattern position calculator, and outputs a pulse position signal; and a signal combining section which combines said pulse width signal read by said pattern table reading section and said pulse position signal read from the reference position table, and generates an image signal having a width corresponding to said pulse width signal in said reference position in each pixel.

3. The apparatus according to claim 2, further comprising:

a block averaging processor which divides the inputted image into blocks based on the main scanning synchronizing signal and the sub scanning synchronizing signal, performs an averaging processing of the image data with respect to each block, and outputs the image data subjected to the averaging processing; and a γ correcting selection which subjects an image signal outputted from the block averaging section to γ correction and outputting an γ-corrected image signal, wherein said γ-corrected image signal outputted from said γ correcting selection is supplied to said pattern selecting signal combining section.

4. The apparatus according to claim 2, further comprising:

a γ correcting selection which subjects an inputted image signal to γ correction and outputs an γ-corrected image signal; and a block averaging section which divides said γ-corrected image outputted from said γ correcting section into blocks based on the main scanning synchronizing signal and the sub scanning synchronizing signal, performs an averaging processing of the image data with respect to each block, and outputs the image data subjected to the averaging processing, wherein the image data outputted from the block averaging section is supplied to said pattern selecting signal combining section.

5. The apparatus according to claim 2, further comprising:

a scanner section which optically reads a draft, and supplies the image signal corresponding to a draft image to said pattern selecting signal combining section; and a printer section which forms the image on a copying paper based on the image data supplied from said signal combining section.

6. The apparatus according to claim 1, wherein the image data read from said pattern table in response to the same in-pattern position signal monotonously changes with a size of said pattern selecting signal.

7. The apparatus according to claim 1, wherein the image data read from said pattern table in response to the same in-pattern position signal changes an increase/decrease direction in at least one portion in accordance with a size of said pattern selecting signal.

8. The apparatus according to claim 1, further comprising:

a scanner section which optically reads a draft, and supplies the image signal corresponding to a draft image to said pattern selecting signal combining section; and a printer section which forms the image on a copying paper based on the image data supplied from said pattern table reading section.

9. An image processing apparatus comprising:

a pattern table which stores a plurality of screen patterns including a predetermined number of pattern data and having different data patterns;

an in-pattern position calculator which generates an in-pattern position signal indicating a position of an input image signal in said screen pattern from a main scanning synchronizing signal and a sub scanning synchronizing signal;

a pattern selecting signal combining section which generates a pattern selecting signal for selecting a specified pattern in said pattern table from said input image signal, and calculates an address in the pattern table and data for interpolation for use in an interpolation processing from the pattern selecting signal and said in-pattern position signal supplied from said in-pattern position calculator;

an interpolation original data reading section which reads two consecutive pattern data in an address space of said pattern table as interpolation original data from said pattern table based on the address in said pattern table calculated by said pattern selecting signal combining section; and an interpolation processor which uses said data for interpolation calculated by said pattern selecting signal combining section, subjects said two interpolation original data read by said interpolation original data reading section to the interpolation processing, and supplies a result of the interpolation processing as image data.

10. The apparatus according to claim 9, wherein said interpolation processor provides said interpolation processing result as a pulse width signal, said apparatus further comprises:

a reference position table which stores reference position data for defining a position in a pixel in which the image corresponding to the pulse width signal read from said interpolation processor is to be formed;

a reference position table reading section which reads said reference position data in said reference position table based on said in-pattern position signal supplied from said in-pattern position calculator, and outputs a pulse position signal; and a signal combining section which combines said pulse width signal read by said interpolation processor and said pulse position signal read from the reference position table, and generates an image signal having a width corresponding to said pulse width signal in said reference position in each pixel.

11. The apparatus according to claim 9, wherein the image data read from said pattern table in response to the same in-pattern position signal monotonously changes with a size of said pattern selecting signal.

12. The apparatus according to claim 9, wherein the image data read from said pattern table in response to the same in-pattern position signal changes an increase/decrease direction in at least one portion in accordance with a size of said pattern selecting signal.

13. The apparatus according to claim 9, further comprising:
   a scanner section which optically reads a draft, and supplies the image signal corresponding to a draft image to said pattern selecting signal combining section; and
   a printer section which forms the image on a copying paper based on the image data supplied from said signal combining section.

14. The apparatus according to claim 1, further comprising:
   a correspondence pattern change table which, disposed between said pattern selecting signal combining section and said pattern table, changes a correspondence between said input image signal and the pattern data in said pattern table, wherein the correspondence between said input image signal and said pattern data is changed by rewriting a content of a conversion table.

15. An image processing apparatus comprising:
   a pattern table which stores a plurality of screen patterns which have different sizes;
   a pattern size information table which stores size information for each said screen pattern;
   an in-image position calculator which generates an in-image position signal indicating a position of an input image signal in an image from a main scanning synchronizing signal and a sub scanning synchronizing signal;
   a pattern selecting signal combining section which reads the size information of the corresponding screen pattern from said pattern size information table based on the input image signal, and uses the size information and said in-image position signal to calculate an address in the pattern table; and
   a pattern table reading section which reads image data in said pattern table corresponding to the address in said pattern table.

16. An image processing apparatus comprising:
   a channel dividing section which divides an image signal of a plurality of channels into the image signals of the respective channels;
   a pattern table which stores a plurality of screen patterns which include a predetermined number of pattern data and have different data patterns;
   an in-pattern position calculator which generates different in-pattern position signals indicating positions of the input image signals in said screen pattern for the respective channels from a main scanning synchronizing signal and a sub scanning synchronizing signal;
   a pattern selecting signal combining section which generates a pattern selecting signal for selecting a specified pattern in said pattern table for each channel from the input image signal supplied from said channel dividing section, combines the pattern selecting signal with the in-pattern position signal supplied for each channel from said in-pattern position calculator, and supplies an address in said pattern table for each channel; and
   a pattern table reading section which reads pattern data corresponding to the address in the pattern table of each channel from said pattern table and supplying image data.

17. An image processing apparatus comprising:
   a first pattern table which stores a plurality of screen patterns which include a first predetermined number of pattern data and have different data patterns;
   a second pattern table which stores a plurality of screen patterns which include a second predetermined number of pattern data and have different data patterns;
   a first in-pattern position calculator which generates an in-pattern position signal indicating a position of an input image signal in the screen pattern in said first pattern table from a main scanning synchronizing signal and a sub scanning synchronizing signal;
   a second in-pattern position calculator which generates an in-pattern position signal indicating the position of the input image signal in the screen pattern in said second pattern table from the main scanning synchronizing signal and the sub scanning synchronizing signal;
   a first pattern selecting signal combining section which generates a pattern selecting signal for selecting a specified pattern in said first pattern table from said input image signal, combines the pattern selecting signal with said in-pattern position signal supplied from said first in-pattern position calculator, and supplies an address in said first pattern table;
   a second pattern selecting signal combining section which generates the pattern selecting signal for selecting the specified pattern in said second pattern table from said input image signal, combines the pattern selecting signal with said in-pattern position signal supplied from said second in-pattern position calculator, and supplies the address in said second pattern table;
   a first pattern table reading section which reads pattern data corresponding to the address in said first pattern table from said first pattern table and supplying image data;
   a second pattern table reading section which reads pattern data corresponding to the address in said second pattern table from said second pattern table and supplies the image data; and
   a signal selecting section which selects and outputs one of the image data supplied from said first and second pattern table reading sections in response to an inputted pattern table change signal.

18. An image processing method comprising the steps of:
   storing a plurality of screen patterns which include a predetermined number of pattern data and have different data patterns as a pattern table in a storage;
   generating an in-pattern position signal indicating a position of an input image signal in said screen pattern from a main scanning synchronizing signal and a sub scanning synchronizing signal;
   generating a pattern selecting signal for selecting a specified pattern in said pattern table from said input image signal, combining the pattern selecting signal with said in-pattern position signal, and supplying an address in the pattern table; and
   reading pattern data corresponding to the address in said pattern table from said pattern table and supplying image data.

19. The method according to claim 18, wherein said pattern data read from said pattern table is a pulse width signal,
   said method further comprises:
   storing reference position data for defining a position in a pixel in which the image corresponding to the pulse width signal read from said pattern table is to be formed as a reference position table in a storage;

reading said reference position data in said reference position table based on said in-pattern position signal, and outputting a pulse position signal; and combining said pulse width signal and said pulse position signal, and generating an image signal having a width corresponding to said pulse width signal in said reference position in each pixel.

20. An image processing method comprising the steps of:

storing a plurality of screen patterns including a predetermined number of pattern data and having different data patterns as a pattern table in a storage;

generating an in-pattern position signal indicating a position of an input image signal in said screen pattern from a main scanning synchronizing signal and a sub scanning synchronizing signal;

generating a pattern selecting signal for selecting a specified pattern in said pattern table from said input image signal, and calculating an address in the pattern table and data for interpolation for use in an interpolation processing from the pattern selecting signal and said in-pattern position signal;

reading two consecutive pattern data in an address space of said pattern table as interpolation original data from said pattern table based on the address in said pattern table; and using said data for interpolation, subjecting said two interpolation original data to the interpolation processing, and supplying a result of the interpolation processing as image data.

21. The method according to claim 20, wherein said step of performing the interpolation processing comprises a step of providing said interpolation processing result as a pulse width signal, said method further comprising:

storing reference position data for defining a position in a pixel in which the image corresponding to said pulse width signal is to be formed as a reference position table in a storage;

reading said reference position data in said reference position table based on said in-pattern position signal, and outputting a pulse position signal; and combining said pulse width signal and said pulse position signal, and generating an image signal having a width corresponding to said pulse width signal in said reference position in each pixel.

22. An information storage medium which includes a program comprising the steps of:

storing a plurality of screen patterns which include a predetermined number of pattern data and have different data patterns as a pattern table in a storage;

generating an in-pattern position signal indicating a position of an input image signal in said screen pattern from a main scanning synchronizing signal and a sub scanning synchronizing signal;

generating a pattern selecting signal for selecting a specified pattern in said pattern table from said input image signal, combining the pattern selecting signal with said in-pattern position signal, and supplying an address in the pattern table; and reading pattern data corresponding to the address in said pattern table from said pattern table and supplying image data.

23. The information storage medium according to claim 22, wherein said pattern data read from said pattern table is a pulse width signal, the program further comprises:

storing reference position data for defining a position in a pixel in which the image corresponding to the pulse width signal supplied from said pattern table is to be formed as a reference position table in a storage;

reading said reference position data in said reference position table based on said in-pattern position signal, and outputting a pulse position signal; and combining said pulse width signal and said pulse position signal, and generating an image signal having a width corresponding to said pulse width signal in said reference position in each pixel.

24. An information storage medium which includes a program comprising the steps of:

storing a plurality of screen patterns including a predetermined number of pattern data and having different data patterns as a pattern table in a storage;

generating an in-pattern position signal indicating a position of an input image signal in said screen pattern from a main scanning synchronizing signal and a sub scanning synchronizing signal;

generating a pattern selecting signal for selecting a specified pattern in said pattern table from said input image signal, and calculating an address in the pattern table and data for interpolation for use in an interpolation processing from the pattern selecting signal and said in-pattern position signal;

reading two consecutive pattern data in an address space of said pattern table as interpolation original data from said pattern table based on the address in said pattern table; and using said data for interpolation, subjecting said two interpolation original data to the interpolation processing, and supplying a result of the interpolation processing as image data.

25. The information storage medium according to claim 24, wherein said step of performing the interpolation processing comprises a step of providing said interpolation processing result as a pulse width signal, the program further comprises:

storing reference position data for defining a position in a pixel in which the image corresponding to said pulse width signal is to be formed as a reference position table in a storage;

reading said reference position data in said reference position table based on said in-pattern position signal, and outputting a pulse position signal; and combining said pulse width signal and said pulse position signal, and generating an image signal having a width corresponding to said pulse width signal in said reference position in each pixel.

* * * * *